United States Patent [19]

Moore

[11] Patent Number: 4,579,580

[45] Date of Patent: Apr. 1, 1986

[54] UREA-METHYLOLUREA PLANT FOOD COMPOSITION

[76] Inventor: William P. Moore, P.O. Box 1270, Hopewell, Va. 23860

[21] Appl. No.: 630,993

[22] Filed: Jul. 13, 1984

Related U.S. Application Data

[63] Continuation-in-part of Ser. No. 433,357, Dec. 22, 1982, abandoned.

[51] Int. Cl.$^4$ .............................................. C05C 9/00
[52] U.S. Cl. ...................................... 71/28; 71/64.10
[58] Field of Search ................... 71/28, 30, 64.8, 64.1

[56] References Cited

U.S. PATENT DOCUMENTS

| | | | |
|---|---|---|---|
| 3,235,370 | 2/1966 | Kealy ........................................ | 71/29 |
| 3,462,256 | 8/1969 | Justice et al. ........................... | 71/28 |
| 4,244,727 | 1/1981 | Moore ...................................... | 71/29 |
| 4,304,588 | 12/1981 | Moore ...................................... | 71/28 |

OTHER PUBLICATIONS

Soil Fertility and Fertilizers, 2nd Edition, Tisdale and Nelson, the Macmillan Company, N.Y., N.Y., 1966, pp. 169, 174–176.

*Primary Examiner*—Ferris H. Lander

[57] ABSTRACT

Storage stable liquid plant food compositions are provided exhibiting low saltout temperatures, high nitrogen concentrations, and reduced nitrogen release rates, comprising urea, uncondensed methylolurea, and water, present in particular proportions.

4 Claims, 4 Drawing Figures

UREA—WATER—METHYLOLUREA
PHASE DIAGRAM

UREA-METHYLOLUREA PLANT FOOD COMPOSITION

This application is a continuation of application Ser. No. 433,357 filed Dec. 22, 1982, now abandoned.

BACKGROUND OF THE INVENTION

1. Field of the Invention

This invention relates to plant food solutions, and more particularly, to storage stable liquid compositions comprising urea, uncondensed methylolurea, and water, combined as plant food solutions containing high nitrogen concentrations which exhibit properties of low saltout temperatures and low phytotoxicity.

2. Description of the Prior Art

Urea is one of the most economical and widely used plant food nitrogen sources. It is mainly used as a granular solid or as a mixed aqueous solution with an ammonium salt such as nitrate. The mixed solutions are necessary to achieve the commercially necessary high nitrogen concentrations and low saltout temperatures. Saltout temperature (hereinafter called SOT) is that temperature at, and below, which a plant food solution is no longer clear because one, or more, of the solution constituents has precipitated. Unfortunately, aqueous urea solutions containing substantial nitrogen concentrations have SOT's which are too high for general commercial use. For example, the maximum nitrogen concentration which may be achieved in an aqueous urea solution having a SOT of 0° C. is 16 weight percent.

Urea in aqueous solution frequently causes plasmolysis, or burn, in plants treated with the required amounts of nitrogen, particularly where the solution is allowed to contact the foliage of the plants. Mixed aqueous solutions containing urea with an ammonium salt, such as nitrate or sulfate, have even higher burn potential than does aqueous urea.

The burn tendency of urea has been reduced by many workers in the field by condensing it with formaldehyde to produce slow releasing urea polymers as indicated by Tisdale and Nelson on pages 174–176 in the Second Edition of Soil Fertility and Fertilizers.

Kealy in U.S. Pat. No. 3,235,370 provided a non-condensed urea-formaldehyde liquid suspension which was storable for 30 days. He did not provide an economical urea, urea-formaldehyde, water solution; a clear solution storable for about one year or more; nor an eutectic urea, methylolurea, water solution having a low SOT. U.S. Pat. No. 3,462,256, to Justice, et al, discloses a concentrated urea-formaldehyde solution containing 20 percent water or less in which between 50 and 80 percent of the formaldehyde is present as methylene ureas.

U.S. Pat. No. 4,304,588 to Moore discloses a clear storage stable, concentrated urea-formaldehyde-based solution containing 50 percent or more of the urea in the form of methylolurea with an overall molar ratio of urea to formaldehyde between 1.4 and 1.9, and a process for the preparation of this solution. Although the solution disclosed was low in the potential for burning plant foliage, no teaching was provided regarding economical eutectic solutions containing urea, methylolurea, and water, having high total nitrogen concentrations and low SOT's. The addition of urea to the product of U.S. Pat. No. 4,304,588, or to other urea-formaldehyde products of the prior art, to improve economics caused a significant increase in the SOT of the mixture, to a point where it is not useful as a plant food solution under normal circumstances.

Thus, no teaching was available from the prior art which would allow the blending of low-burn liquid urea-formaldehyde products with low cost nitrogen plant food chemicals to produce economical plant food solutions which were useful under a wide range of storage times and temperatures, while still retaining a lower tendency to cause burn to treated plants than urea or inorganic nitrogen fertilizers. Such a liquid plant food composition has been especially needed for fertilization of turf and other grasses, and for foliar feeding of many crop and ornamental plants and could be used as a row crop fertilizer or as a manufacturing solution for other liquid or solid fertilizers.

SUMMARY OF THE INVENTION

The present invention provides a novel urea-methylolurea-water concentrate of high agronomic value which is storage stable, and economical, and exhibits desirably low SOT's. The compositions of the present invention are plant food solutions which will remain substantially clear for about one year of more and will not precipitate solid materials at temperature of about 14° C. or higher and preferably not at 0° C. The composition of this invention comprises: between 19 and 31 weight percent total nitrogen, of which total nitrogen between 50 and 75 percent is derived from urea; uncondensed methylolurea, amounting to 1 part by weight per 0.5 to 2.1 parts of urea; and water, amounting to between 30 and 45 weight percent of the total composition. The preferred composition of the present invention contains between 23 and 28 weight percent total nitrogen and is more specifically defined as comprising between 21 and 43 weight percent urea, between 14 and 33 percent uncondensed monomethylolurea, and between 32 and 43 percent water. The compositions of the present invention are further characterized by a pH between 7 and 11 and preferably between 8.5 and 9.5.

Undesirably, SOT is increased when urea is added to methylolurea and other urea-formaldehyde solutions of the prior art, which usually contain about 15 percent water. The addition of water to these solutions, in the absence of added urea, also increases SOT. I have now found that urea and water can be combined with methylolurea in a previously unknown composition to achieve a storage stable solution, containing high nitrogen concentrations, which will not precipitate at normal winter fertilizer storage temperatures.

Methylolureas are formed by the reaction of aqueous urea and formaldehyde. The most common of these compounds are monomethylol- and dimethylolurea. Dimethylolurea tends to breakdown to produce free formaldehyde, so that it is not a satisfactory material for use as a plant food without further reaction. Methylolureas, and particularly monomthylolurea, upon heating at acid, neutral or basic conditions condenses to form methylolurea ethers which are not effective for use in the composition of the instant invention, when two or more monomethylolurea moeities are combined as an ether, because SOT is increased significantly. When aqueous monomethylolurea is acidified, particularly at elevated temperatures, or heated at certain neutral or basic conditions, methylene urea compounds and polymers form. These compounds and polymers have reduced solubilities and are frequently almost totally insoluble. Condensation of methylolurea to either ethers are methylene urea compounds and polymers is undesirable because of increased SOT's, and it has been found that the methylolurea used in the composition of the present invention must be substantially uncondensed with monomethylolurea amounting to 90 percent, or more, of the total urea-formaldehyde portion of the composition.

The composition of the present invention provides a plant food solution which is storage stable for about one year or more, to achieve the storage stability, it is necessary that the methylolurea be substantially uncondensed, and that the pH of the composition be between 7 and 11, and preferably between 8.5 and 9.5. When methylolurea is produced as a commercial aqueous solution, it sometimes contains enough base-buffering material to hold the pH of the composition of this invention in the desired range. Base-buffering solutions found to be effective in maintaining pH in the required range for extended periods of storage were: ammonium hydroxide, sodium carbonate, potassium carbonate, potassium formate, and sodium formate. Although condensation of monomethylolurea is slow enough at pH's between 7 and 11 to allow storage for many practical uses of the composition of this invention, maximum storage times of about one year, or more, were obtained where pH was maintained in the preferred area between 8.5 and 9.5.

The compositions of this invention may be achieved by simply blending the required ingredients in their pure or aqueous forms, or by blending commercial solutions or solids to produce the required composition. The composition may also be prepared by the in-situ reaction of urea and formaldehyde in the presence of sufficient excess urea and water to produce the desired ingredient content.

It is possible to optimize the solubility of a urea-methylolurea-water solution by use of eutectic mixtures at temperatures even higher than 14° C. However, at the eutectic point nitrogen contents are not significantly improved over those of straight urea-water solutions, and also solutions having SOT's higher than 14° C. cause frequent practical problems, such as plugged lines in mildly cool weather, and are of little practical value.

BRIEF DESCRIPTION OF THE DRAWINGS

The composition of this invention may be illustrated by reference to the FIGURES representing plant food solutions of this invention:

Referring to FIG. 1, it can be seen that urea, methylolurea, and water compositions in accordance with the proportions of the present invention form eutectic compositions having greatly enhanced solubilities for urea when total nitrogen content is between 19 and 31 percent. It also may be seen that a plant food solution containing a urea-methylolurea-water composition may be prepared which has a SOT of 0° C. with 54 percent of the nitrogen derived from urea at total nitrogen concentrations of either about 16 or 30 percent by weight in the solutions at saltout, the nitrogen variations being caused by use of different amounts of water. If the eutectic and optimum composition is used, about a 26 percent total nitrogen solution may be prepared much more economically, deriving 69 percent of the total nitrogen from urea. Similar eutectics may be seen on FIG. 1 for SOT's of −12° and 14° C.

Referring to FIG. 2, the criticality of the water content in the urea-methylolurea-water composition may be seen. Surprisingly, the ratio of urea to methylolurea possible for a given SOT does not continuously increase as water content of the composition increases, but peaks between 30 and 40 percent water concentration, depending to a small degree upon the SOT. It may be seen that a 0° C. SOT is obtained using a 1 to 1 weight ratio of urea to methylolurea with about 29 and 51 percent water contents. With the eutectic composition of the present invention a 0° C. SOT was achieved using a 1.5 to 1 weight ratio of urea to methylolurea when the water content is about 38 percent by weight. Similar eutectics were obtained at SOT's of −12°, 0°, and 14° C. at water contents of 37 to 40 percent. A urea to methylolurea ratio of 2.1 was obtained at a SOT of 14° C.

Referring to FIG. 3, it may be seen that in addition to increasing the ratio of urea to methylolurea which may be used for a given SOT, the actual amount of urea contained in the solution may be increased by using the composition of the present invention. It may be noted that a solution having a 0° C. SOT and containing 50 percent water may only contain about 23 percent urea, whereas it may contain about 38 percent urea at the optimum composition containing about 36 percent water.

Figure 1:
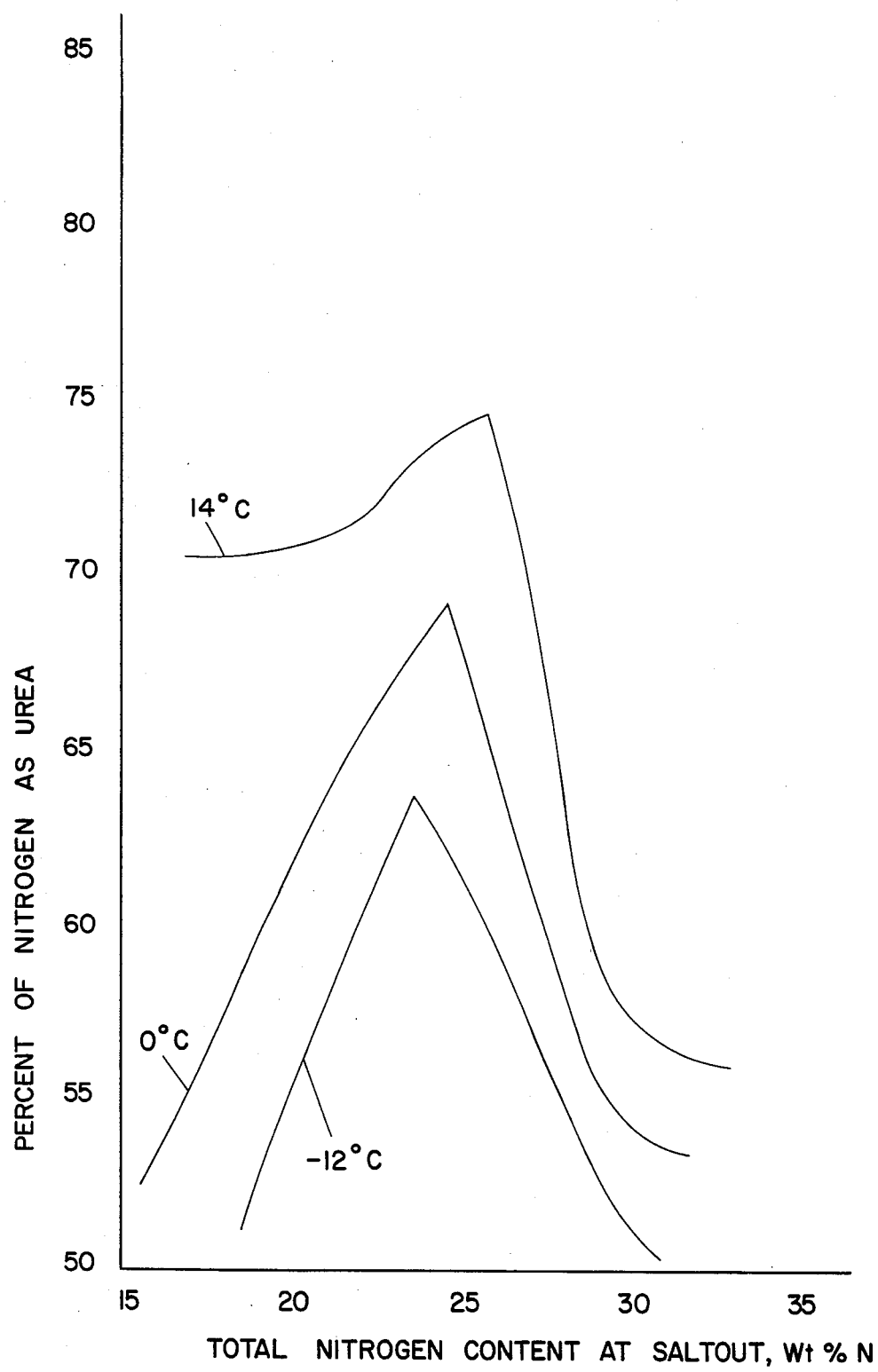
FIG. 1 is a diagram plotting total nitrogen content in solution at saltout vs. percent of the nitrogen in the composition as urea with parameters of SOT's.
Figure 2:
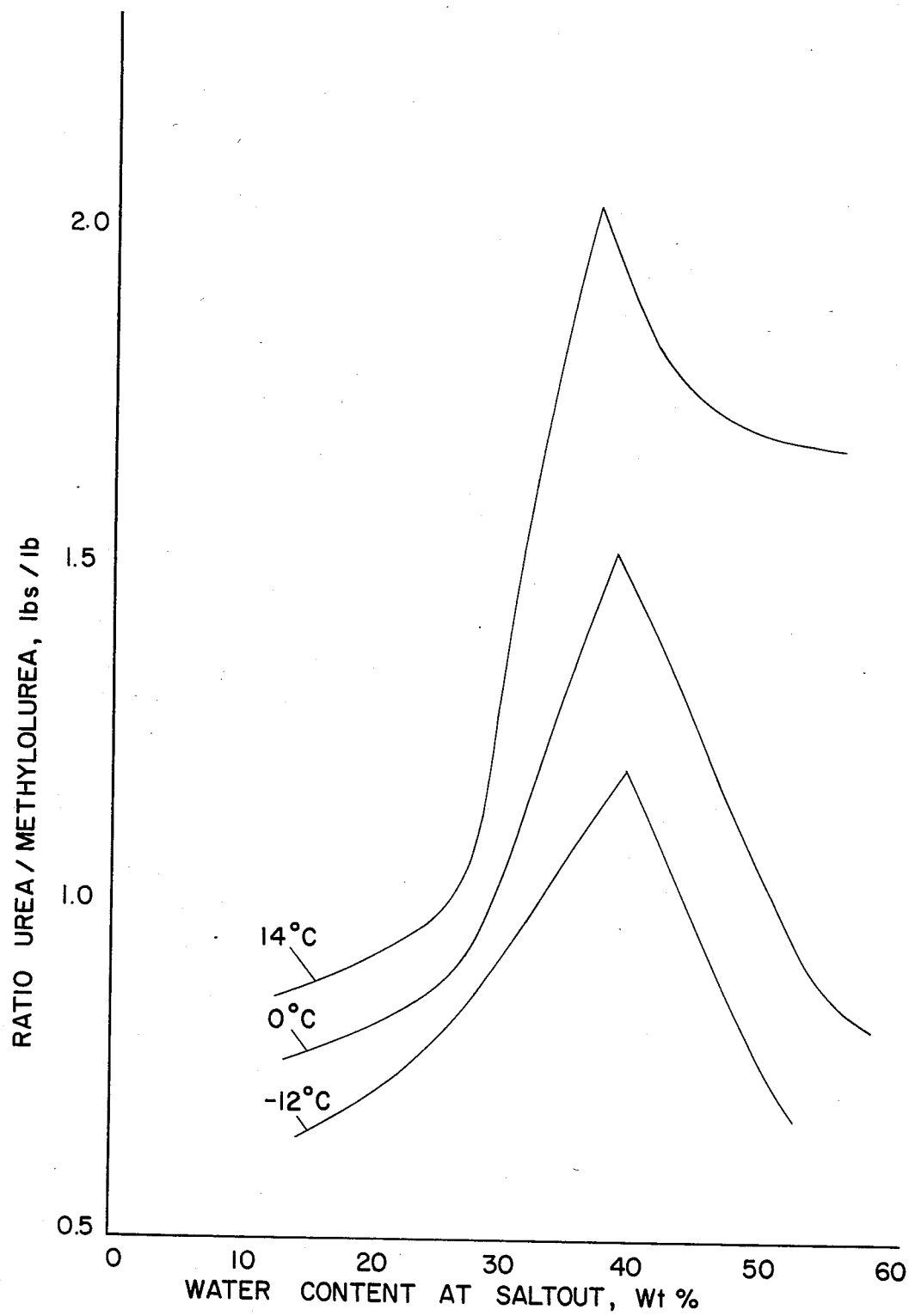
FIG. 2 is a diagram plotting water content in solution at saltout vs. the ratio of urea to methylolurea in the composition with parameters of SOT's.
Figure 3:
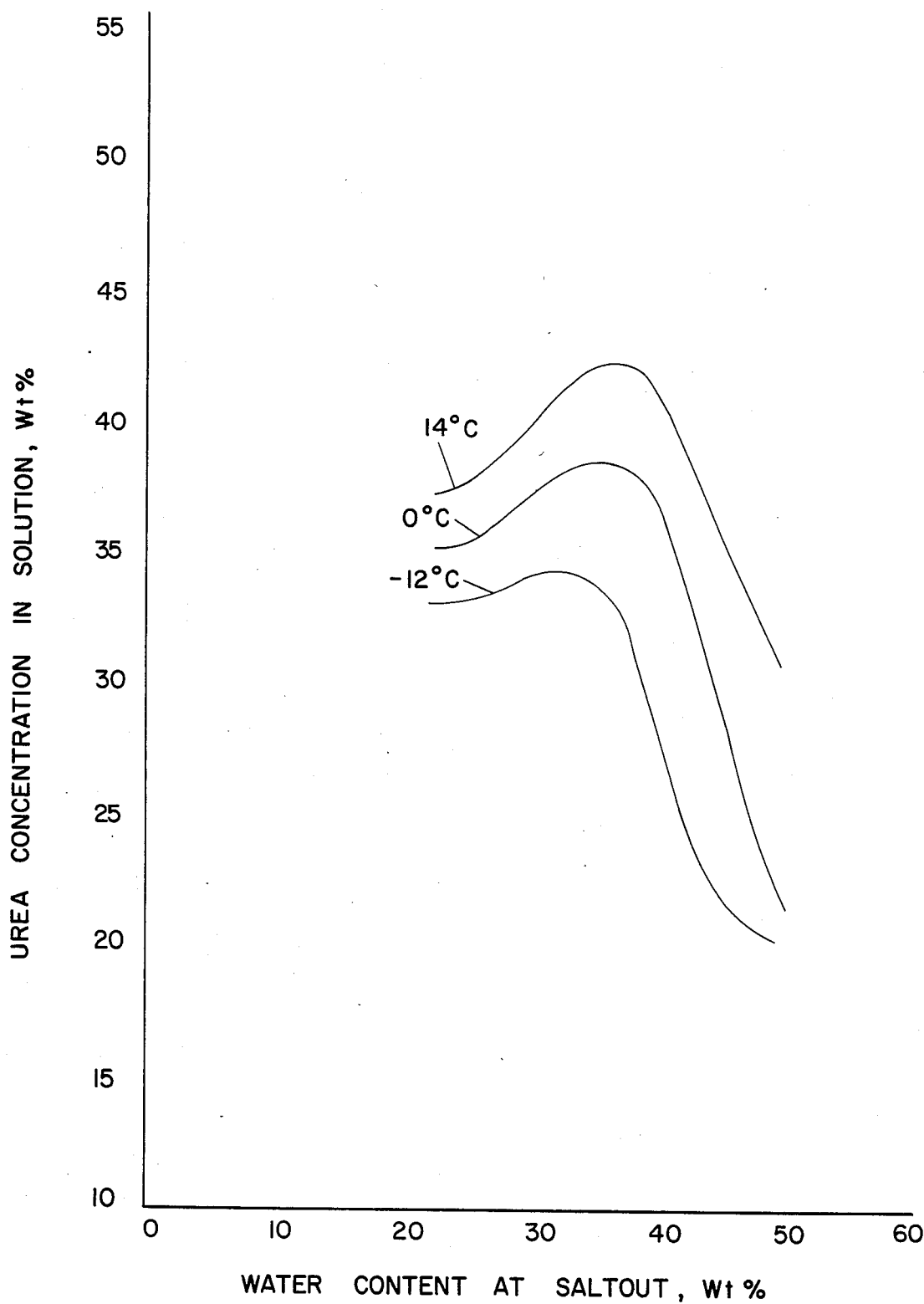
FIG. 3 is a diagram plotting water content in solution at saltout vs. the urea content of the solution, with parameters of SOT's.
Figure 4:
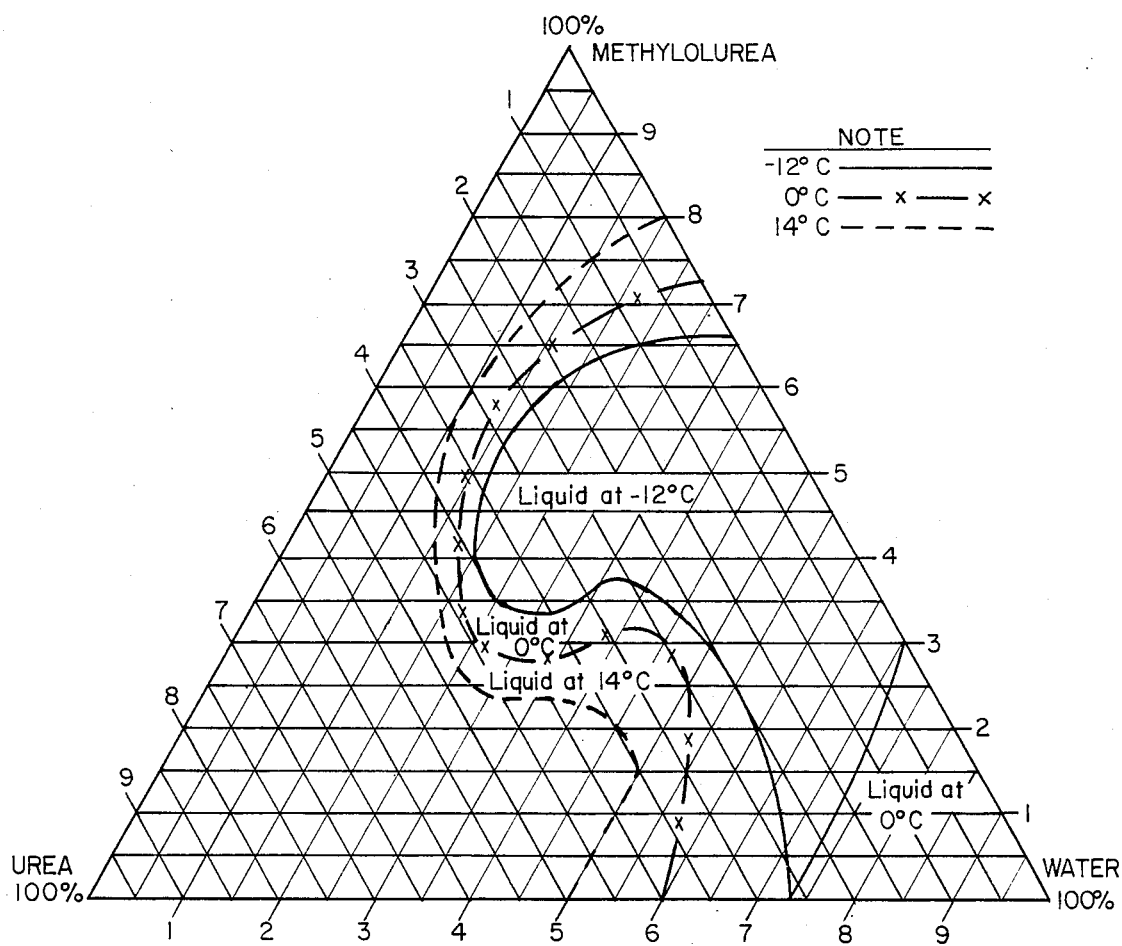
FIG. 4 contains phase diagrams showing urea, water, and methylolurea contents at the compositions where precipitation of solids occurs at temperatures of −12°, 0°, and 14° C. The areas of the diagram titled "Liquid At −12° C." define all urea, water, and methylolurea compositions which are clear liquids. All other areas define compositions which contain at least some salted out solids at −12° C. The areas titled "Liquid At 0° C." define compositions which are clear liquids at 0° C. Compositions liquid at −12° C. are also liquid at 0° C. The areas titled "Liquid At 14° C." define compositions which are clear liquids at 14° C. Compositions which are clear liquid at −12°, and 0° C. are also liquid at 14° C. The phase diagrams were derived by determining saltout temperatures of various mixtures of water, crystal urea, and commercial methylolurea, and then plotting the compositions of the three components at constant saltout temperatures of −12°, 0°, and 14° C.

It may be seen that greatly enhanced amounts of urea may be utilized in the area of the urea-methylolurea-water eutectics, so that compositions having SOT's lower than 14° C. may be obtained with compositions containing between 19 and 31 weight percent nitrogen of which between about 50 and 75 percent is derived from urea.

DESCRIPTION OF THE PREFERRED EMBODIMENTS

Plant food compositions, falling within the scope of this invention, are those plant food compositions having SOT's no greater than 14° C., which comprise aqueous solutions of urea and methylolurea having urea/methylolurea weight ratios between 0.9 and 2.1, total nitrogen contents amounting to between 19 and 31 weight percent, of which total nitrogen between 50 and 75 percent is derived from urea, and water contents amounting to between 30 and 45 weight percent of the total composition. The compositions of this invention are characterized by pH's between 7 and 11. Any departure from these ratios, concentrations, and pH's result in plant food compositions having unsatisfactory SOT's and storage lives.

The preferred embodiments of the present invention are more specifically defined as those plant food compositions having SOT's no greater than 0° C. comprising between 23 and 28 weight percent total nitrogen, between 21 and 43 percent urea, between 14 and 33 percent substantially uncondensed methylolurea of which 90 percent or more is monomethylolurea, and between 32 and 43 percent water, at a pH between 8.5 and 9.5.

The compositions of the present invention may be obtained in a conventional manner by simple admixture of urea, methylolurea and water. A simple preparation may be made by admixing water and urea crystals or prills into an aqueous solution of monomethylolurea and adjusting pH to the desired range by adding small amounts of aqueous potassium carbonate or bicarbonate.

Additionally, these compositions may be obtained by reacting aqueous formaldehyde with excess urea, and water with sufficient buffering agent to produce the required composition directly in-situ without further blending.

The compositions of the present invention are produced as concentrates and are readily adapted for transport and storage. These concentrates are employable directly as fertilizers for the soil and foliage and for manufacturing solid fertilizers. They may be blended with other plant food materials and water to produce plant food solutions for application to the foliage of ornamental and agricultural plants. The compositions of the present invention are further characterized as being substantially free of nitrogen containing precipitates, and hence are storage stable over extended periods of ambient or low temperatures.

The compositions of this invention may be employed in foliar applications, may be applied in irrigation water, may be incorporated in the soil, and applied directly to fertilize the soil. Minor amounts of other ingredients, such as 0.1 to 1 percent surfactant, may be incorporated in the composition to achieve an even coverage of foliage. In addition, small amounts of pesticides, fungicides, and herbicides may be included in small amounts of about 1 percent where desirable.

In order to demonstrate the invention, the following examples are given with all parts and percentages by weight unless otherwise specified:

EXAMPLE 1

A concentrated nitrogen was prepared by blending at ambient temperature in a one-liter beaker equipped with a magnetic bar stirrer, ingredients in the order listed as follows: aqueous monomethylolurea containing 40.7 percent monomethylolurea, 670 grams; and urea crystals, 330 grams; and 2.7 grams of sodium carbonate. A completely clear solution having a pH of 8.1 and a total N content of 23.6 percent was obtained which had a SOT of −12° C. The percent of the total nitrogen derived from free urea was 64.1

EXAMPLE 2

A concentrated nitrogen plant food solution was prepared for shipment, storage, and use in the custom lawn fertilizer industry, starting with 52.7 parts of a commercial methylolurea solution containing 30.7 percent total nitrogen having the following composition:

| Component | Wt % |
| --- | --- |
| Monomethylolurea | 48.0 |
| Urea | 29.5 |
| Methylenediurea | 3.0 |
| Ammonia | 1.0 |
| Potassium Bicarbonate | 4.3 |
| Water | 14.2 |

To the above methylolurea solution, containing 94 percent of its urea-formaldehyde compounds as monomethylolurea, was added 28.1 parts of water and 19.2 parts of hot aqueous urea liquor containing 90 percent urea, and the solution was mixed at ambient temperature until homogeneous in a large steel batch tank to produce a total of 50 tons of solution. The SOT of the final clear mixture which contained 24.0 percent total nitrogen of which 62.7 percent derived from free urea, was −12° C., and pH was 9.1.

EXAMPLE 3

Another concentrated nitrogen plant food solution was prepared using the same commercial methylolurea solution, containing 30.7 percent total nitrogen, as used in Example 2. To 50 parts of that solution were added 22 parts water and 28 parts of hot aqueous urea, containing 90 percent urea. The SOT of the final composition, containing 27.0 percent total nitrogen of which 68.0 percent derived from urea, was 10° C. The $K_2O$ content of the plant food concentrate was found to be 1.0 percent. The ratio of urea to methylolurea was 1.56 and total water content in the composition was 31.9 percent.

EXAMPLE 4

The produce from Example 2 was shipped by tank truck, and stored in a large steel tank prior to blending with additional water and potassium chloride to produce a solution for direct application to residential lawns. The analysis of the formulated solution applied to Kentucky Bluegrass Turf was 4-0-1. The solution was applied at a rate of 1.3 pounds of nitrogen per 1000 square feet of turf area in Southern Ohio in August. The turf showed good response within a 7-day period with the green color of the grass deepening significantly. There was no leaf burn or yellowing of the blade tips.

A similar treatment in adjacent turf plots using a 4-0-1 solution formulated with urea as the only nitrogen source clearly showed tip burn and yellowing on the Bluegrass.

The concentrated composition of Example 2 was stored in a steel drum for one year and remained clear with no precipitated solids evident.

EXAMPLE 5

A concentrated nitrogen plant food solution suitable for shipment, storage, and use in the foliar feeding of crops and ornamental plants is prepared in four stirred stainless steel reactors operating in a continuous manner in series, with each reactor jacketed for heating and cooling. Ingredients, having an overall urea to formaldehyde mol ratio of 2.79, are charged continuously to the first reactor and overflowing from the first through the fourth reactor in order in amounts listed as follows:

| Ingredients | Feed Rate, lbs/hr |
|---|---|
| Ammonia | 167.7 |
| Urea Liquor (90% Urea) | 5627.7 |
| NaOH Solution (50% NaOH) | 384.9 |
| $CO_2$ Gas | 158.9 |
| HCHO Solution (50% HCHO) | 2407.5 |
| Water | 3817.9 |
| Total | 12564.6 |

The reactors are operated to allow a total reaction time of 60 minutes at temperatures between 90° and 93° C. and pH's between 11.0 initially and 9.1 in the product discharged from the final reactor. The liquid product is cooled to ambient temperature as it leaves the fourth reactor, and is stored in steel storage tanks at ambient temperatures. The composition of the stored product is as follows:

| Components | Wt % |
|---|---|
| Monomethylolurea | 28.3 |
| Urea | 27.0 |
| Methylenediurea | 1.8 |
| Ammonia | 0.6 |
| Potassium Bicarbonate | 2.5 |
| Water | 39.8 |

The final composition contains 22.6 percent total nitrogen of which 55.0 percent derives from free urea and has a SOT of −14° C. The pH of the final product is 9.5.

Water soluble base buffering materials can be added to the compositons of this invention before production, or during storage to maintain the pH required for stability. Buffering materials used successfully include: ammonium hydroxide, sodium carbonate, potassium carbonate, potassium formate, and sodium formate. Ammonium hydroxide is the normal aqueous form of ammonia which may be added either as ammonium hydroxide, ammonium salts, or anhydrous ammonia. In the buffering reaction, the base buffering materials may be converted completely, or partially, to other compounds, usually salts. For example, alkali carbonates are usually converted to the bicarbonates and/or the formates in the desired pH ranges of the present invention. Mixtures of the base buffering materials are normally employed, usually including ammonium hydroxide and an alkali metal salt.

I claim:

1. A storage stable plant food composition, exhibiting saltout temperatures between −12° and 14° C. and a low potential for foliar burn, comprising a liquid eutectic mixture of urea, uncondensed methylolurea, and water, containing between 19 and 31 weight percent total nitrogen, of which more than 50 percent and less than 75 percent of said nitrogen is derived from urea.

2. A storage stable plant food composition in accordance with claim 1 containing, in addition to said liquid eutectic mixture, water soluble pH buffering compounds selected from the group of ammonium hydroxide, sodium carbonate, potassium carbonate, potassium formate, and mixtures thereof.

3. A storage stable plant food composition containing between 19 and 31 percent by weight total nitrogen, and exhibiting a pH between 7 and 11 and a saltout temperature between −12° and 14° C., comprising a liquid eutectic mixture of urea, uncondensed methylolurea, and water combined to form a weight ratio of more than 1.0 part and less than 2.1 parts of urea per part of methylolurea, and a water concentration amounting to between 30 and 45 percent by weight of said composition.

4. A plant food composition for application to plant foliage, containing between 23 and 28 weight percent total nitrogen, of which more than 50 percent and less than 75 percent of said nitrogen is derived from urea, exhibiting a pH between 8.5 and 9.5 and a saltout temperature between −12° and 14° C., comprising a liquid eutectic mixture containing between 21 and 43 percent urea, between 14 and 33 percent substantially uncondensed methylolurea of which more than 90 percent is monomethylolurea, and between 32 and 43 percent water.

* * * * *